(12) United States Patent
Lam et al.

(10) Patent No.: US 10,534,907 B2
(45) Date of Patent: Jan. 14, 2020

(54) PROVIDING SEMANTIC CONNECTIVITY BETWEEN A JAVA APPLICATION SERVER AND ENTERPRISE THREAT DETECTION SYSTEM USING A J2EE DATA

(71) Applicant: SAP SE, Walldorf (DE)

(72) Inventors: Thanh-Phong Lam, Heidelberg (DE); Jens Baumgart, Dossenheim (DE); Florian Kraemer, Dielheim (DE); Volker Guzman, Heidelberg (DE); Anne Jacobi, Wiesloch (DE); Kathrin Nos, Nussloch (DE); Jona Hassforther, Heidelberg (DE); Omar-Alexander Al-Hujaj, Bad Schönborn (DE); Stefan Rossmanith, Walldorf (DE); Thorsten Menke, Bad Iburg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/380,379

(22) Filed: Dec. 15, 2016

(65) Prior Publication Data
US 2018/0173872 A1 Jun. 21, 2018

(51) Int. Cl.
*G06F 21/55* (2013.01)
*G06F 9/48* (2006.01)

(52) U.S. Cl.
CPC .................. *G06F 21/552* (2013.01)

(58) Field of Classification Search
CPC ...... G06F 21/552; G06F 9/4843; G06F 9/461; G06F 2221/034; G06F 17/40
See application file for complete search history.

(56) References Cited

U.S. PATENT DOCUMENTS

| | | | |
|---|---|---|---|
| 5,440,726 A * | 8/1995 | Fuchs | G06F 11/1402 714/20 |
| 5,960,170 A | 9/1999 | Chen | |
| 6,173,418 B1 * | 1/2001 | Fujino | G06F 11/3476 714/20 |
| 6,629,106 B1 | 9/2003 | Narayanaswamy | |
| 6,779,001 B1 * | 8/2004 | Kanai | G06F 9/466 |
| 7,376,969 B1 | 5/2008 | Njemanze | |
| 7,380,205 B2 | 5/2008 | Bezrukov et al. | |
| 7,441,197 B2 | 10/2008 | Tschiegg et al. | |
| 7,457,792 B2 | 11/2008 | Weigt et al. | |
| 7,457,793 B2 | 11/2008 | Weigt et al. | |

(Continued)

OTHER PUBLICATIONS

Office Action in related U.S. Appl. No. 15/216,201 dated Mar. 7, 2018; 14 pages.

(Continued)

*Primary Examiner* — Meng Li
(74) *Attorney, Agent, or Firm* — Fish & Richardson P.C.

(57) ABSTRACT

A log processing job executing on a log producing computing system is initiated for processing log data associated with the log producing computing system. Log entries are determined to be available for processing. At least one instance of a Log Extractor Factory, Reader, and Transformation component are instantiated for reading and transforming the log data. Read log data is transformed into a common semantic format as transformed log data and transmitted in real-time to a Streaming Component for storage in an Enterprise Threat Detection (ETD) System. A recovery point is stored with a recovery timestamp indicating a next log entry in the log data to process.

15 Claims, 3 Drawing Sheets

(56) References Cited

U.S. PATENT DOCUMENTS

| | | |
|---|---|---|
| 7,457,794 B2 | 11/2008 | Weigt et al. |
| 7,545,969 B2 | 6/2009 | Bennett |
| 7,624,092 B2 | 11/2009 | Lieske et al. |
| 7,627,544 B2 | 12/2009 | Chkodrov |
| 7,756,808 B2 | 7/2010 | Weigt et al. |
| 7,756,809 B2 | 7/2010 | Weigt et al. |
| 7,761,396 B2 | 7/2010 | Weigt et al. |
| 7,783,723 B2 | 8/2010 | Peng et al. |
| 7,788,718 B1 | 8/2010 | Fei |
| 7,872,982 B2 | 1/2011 | Atkins |
| 7,908,660 B2 | 3/2011 | Bahl |
| 7,934,257 B1 | 4/2011 | Kienzle |
| 7,961,633 B2 | 6/2011 | Shankar |
| 7,971,209 B2 | 6/2011 | Eberlein et al. |
| 8,051,034 B2 | 11/2011 | Mehta et al. |
| 8,091,117 B2 | 1/2012 | Williams |
| 8,474,047 B2 | 6/2013 | Adelstein |
| 8,484,726 B1 | 7/2013 | Sutton |
| 8,554,907 B1 | 10/2013 | Chen et al. |
| 8,661,103 B2 | 2/2014 | Mehta et al. |
| 8,775,671 B2 | 7/2014 | Rodeck et al. |
| 8,892,454 B2 | 11/2014 | Rabetge et al. |
| 8,954,602 B2 | 2/2015 | Seifert et al. |
| 8,973,147 B2 | 3/2015 | Pearcy |
| 9,037,678 B2 | 5/2015 | Mehta et al. |
| 9,075,633 B2 | 7/2015 | Nos |
| 9,106,697 B2 | 8/2015 | Capalik et al. |
| 9,116,906 B2 | 8/2015 | Nos et al. |
| 9,148,488 B2 | 9/2015 | Rabetge et al. |
| 9,170,951 B1 | 10/2015 | He |
| 9,251,011 B2 | 2/2016 | Meier et al. |
| 9,262,519 B1 | 2/2016 | Saurabh |
| 9,304,978 B2 | 4/2016 | Bezrukov et al. |
| 9,313,421 B2 | 4/2016 | Deshpande |
| 9,336,385 B1 | 5/2016 | Spencer |
| 9,348,665 B2 | 5/2016 | Storz et al. |
| 9,383,934 B1 | 7/2016 | Likacs |
| 9,419,989 B2 | 8/2016 | Harris |
| 9,524,389 B1 | 12/2016 | Roth |
| 9,619,984 B2 | 4/2017 | Donovan |
| 9,690,931 B1 | 6/2017 | Anantharaju et al. |
| 9,779,147 B1 | 10/2017 | Sherman et al. |
| 9,843,596 B1 | 12/2017 | Avelbuch |
| 9,979,741 B2 | 5/2018 | Fuhrman |
| 1,000,138 A1 | 6/2018 | Das et al. |
| 10,079,842 B1 | 9/2018 | Brandwine et al. |
| 1,010,237 A1 | 10/2018 | Seifert et al. |
| 10,140,447 B2 | 11/2018 | Rahaman et al. |
| 10,148,675 B1 | 12/2018 | Brandwine et al. |
| 2002/0070953 A1 | 6/2002 | Barg |
| 2003/0074471 A1 | 4/2003 | Anderson |
| 2003/0115484 A1 | 6/2003 | Mariconi et al. |
| 2003/0217137 A1 | 11/2003 | Roese |
| 2004/0044912 A1 | 3/2004 | Connary |
| 2004/0078490 A1 | 4/2004 | Anderson |
| 2004/0093513 A1 | 5/2004 | Cantrell |
| 2006/0037075 A1 | 2/2006 | Frattura |
| 2006/0059115 A1 | 3/2006 | Gulfleisch et al. |
| 2006/0161816 A1 | 7/2006 | Gula et al. |
| 2006/0253907 A1 | 11/2006 | McConnell |
| 2007/0067438 A1 | 3/2007 | Goranson et al. |
| 2007/0073519 A1 | 3/2007 | Long |
| 2007/0100905 A1 | 5/2007 | Masters et al. |
| 2007/0115998 A1 | 5/2007 | McEligott |
| 2007/0136437 A1 | 6/2007 | Shankar et al. |
| 2007/0150596 A1 | 6/2007 | Miller et al. |
| 2007/0183389 A1 | 8/2007 | Clee |
| 2007/0186284 A1 | 8/2007 | McConnell |
| 2007/0266387 A1 | 11/2007 | Henmi |
| 2007/0283192 A1 | 12/2007 | Shevchenko |
| 2007/0300296 A1 | 12/2007 | Kudla |
| 2008/0033966 A1 | 2/2008 | Wahl |
| 2008/0034425 A1 | 2/2008 | Overcash et al. |
| 2008/0080384 A1 | 4/2008 | Atkins |
| 2008/0091681 A1 | 4/2008 | Dwivedi |
| 2008/0295173 A1 | 11/2008 | Tsvetanov |
| 2008/0320552 A1 | 12/2008 | Kumar |
| 2009/0044277 A1 | 2/2009 | Aaron et al. |
| 2009/0049518 A1 | 2/2009 | Roman |
| 2009/0288164 A1 | 11/2009 | Adelstein |
| 2009/0293046 A1 | 11/2009 | Cheriton |
| 2009/0300045 A1 | 12/2009 | Chaudhry et al. |
| 2009/0312026 A1 | 12/2009 | Parameswar |
| 2010/0011031 A1 | 1/2010 | Huang |
| 2010/0114832 A1 | 5/2010 | Lillibridge |
| 2010/0180325 A1 | 7/2010 | Golobay |
| 2011/0213741 A1 | 9/2011 | Shama |
| 2011/0277034 A1 | 11/2011 | Hanson |
| 2011/0320816 A1 | 12/2011 | Yao |
| 2012/0005542 A1 | 1/2012 | Petersen |
| 2012/0158653 A1 | 6/2012 | Shaffer et al. |
| 2012/0167161 A1 | 6/2012 | Kim et al. |
| 2012/0191660 A1 | 7/2012 | Hoog |
| 2012/0210434 A1 | 8/2012 | Curtis et al. |
| 2012/0271790 A1 | 10/2012 | Lappas et al. |
| 2012/0317078 A1 | 12/2012 | Zhou et al. |
| 2013/0086023 A1* | 4/2013 | Tsukamoto ............ G06Q 10/10 707/705 |
| 2013/0106830 A1 | 5/2013 | de Loera |
| 2013/0198840 A1 | 8/2013 | Drissi et al. |
| 2013/0212709 A1 | 8/2013 | Tucker |
| 2013/0262311 A1 | 10/2013 | Buhrmann |
| 2013/0298243 A1 | 11/2013 | Kumar et al. |
| 2013/0304665 A1 | 11/2013 | Rodeck et al. |
| 2013/0304666 A1 | 11/2013 | Rodeck et al. |
| 2013/0305369 A1 | 11/2013 | Karta |
| 2013/0326079 A1 | 12/2013 | Seifert et al. |
| 2013/0347111 A1 | 12/2013 | Karta |
| 2014/0047413 A1 | 2/2014 | Sheive et al. |
| 2014/0201836 A1 | 7/2014 | Amsler |
| 2014/0223283 A1 | 8/2014 | Hancock |
| 2014/0244623 A1 | 8/2014 | King |
| 2014/0317681 A1 | 10/2014 | Shende |
| 2015/0007325 A1 | 1/2015 | Eliseev |
| 2015/0067880 A1 | 3/2015 | Ward |
| 2015/0106867 A1 | 4/2015 | Liang |
| 2015/0143521 A1 | 5/2015 | Eliseev |
| 2015/0154524 A1 | 6/2015 | Borodow |
| 2015/0180891 A1 | 6/2015 | Seward |
| 2015/0215329 A1 | 7/2015 | Singla |
| 2015/0237065 A1 | 8/2015 | Roytman |
| 2015/0264011 A1 | 9/2015 | Liang |
| 2015/0278371 A1 | 10/2015 | Anand |
| 2015/0281278 A1 | 10/2015 | Gooding |
| 2015/0319185 A1 | 11/2015 | Kirti |
| 2015/0341389 A1 | 11/2015 | Kurakami |
| 2015/0347751 A1 | 12/2015 | Card et al. |
| 2015/0355957 A1 | 12/2015 | Steiner |
| 2015/0358344 A1 | 12/2015 | Mumcuoglu |
| 2015/0381646 A1 | 12/2015 | Lin |
| 2016/0057166 A1 | 2/2016 | Chesla |
| 2016/0057167 A1 | 2/2016 | Bach et al. |
| 2016/0065594 A1 | 3/2016 | Srivastava et al. |
| 2016/0092535 A1 | 3/2016 | Kuchibhotla et al. |
| 2016/0127391 A1 | 5/2016 | Kobres |
| 2016/0202893 A1 | 7/2016 | Mustonen et al. |
| 2016/0226905 A1 | 8/2016 | Baikalov et al. |
| 2016/0248798 A1 | 8/2016 | Cabrera et al. |
| 2016/0291982 A1 | 10/2016 | Mizrahi |
| 2016/0292061 A1 | 10/2016 | Marron |
| 2016/0337384 A1 | 11/2016 | Jansson |
| 2016/0359886 A1 | 12/2016 | Yadav et al. |
| 2016/0364315 A1 | 12/2016 | Lee |
| 2016/0364571 A1 | 12/2016 | Lee |
| 2016/0373476 A1 | 12/2016 | Dell'anno et al. |
| 2016/0378978 A1 | 12/2016 | Singla |
| 2016/0381049 A1 | 12/2016 | Lakhani |
| 2017/0004005 A1 | 1/2017 | Elliott |
| 2017/0026400 A1 | 1/2017 | Adams et al. |
| 2017/0031002 A1 | 2/2017 | Newton et al. |
| 2017/0034023 A1 | 2/2017 | Nickolov |
| 2017/0070415 A1 | 3/2017 | Bell et al. |
| 2017/0091008 A1 | 3/2017 | Cherbakov |
| 2017/0093902 A1 | 3/2017 | Roundy et al. |

(56) References Cited

U.S. PATENT DOCUMENTS

| | | |
|---|---|---|
| 2017/0148060 A1 | 5/2017 | Showers |
| 2017/0169217 A1 | 6/2017 | Rahaman |
| 2017/0251365 A1 | 8/2017 | Burchard |
| 2017/0270006 A1 | 9/2017 | Kankylas |
| 2017/0279837 A1 | 9/2017 | Dasgupta |
| 2017/0287179 A1 | 10/2017 | Tibshirani et al. |
| 2017/0302685 A1 | 10/2017 | Ladnai et al. |
| 2017/0308602 A1 | 10/2017 | Raghunathan et al. |
| 2017/0316026 A1 | 11/2017 | Kanthak et al. |
| 2017/0322993 A1 | 11/2017 | Brodt et al. |
| 2017/0324766 A1 | 11/2017 | Gonzalez |
| 2018/0027002 A1 | 1/2018 | Rodeck et al. |
| 2018/0027010 A1 | 1/2018 | Pritzkau et al. |
| 2018/0059876 A1 | 3/2018 | Peng et al. |
| 2018/0063167 A1 | 3/2018 | Rodeck |
| 2018/0091535 A1 | 3/2018 | Chrosziel |
| 2018/0091536 A1 | 3/2018 | Chrosziel et al. |
| 2018/0157835 A1 | 6/2018 | Nos |
| 2018/0173873 A1 | 6/2018 | Hassforther et al. |
| 2018/0176234 A1 | 6/2018 | Kunz et al. |
| 2018/0176235 A1 | 6/2018 | Lam et al. |
| 2018/0176238 A1 | 6/2018 | Nos et al. |
| 2018/0234447 A1 | 8/2018 | Mueen |
| 2019/0005423 A1 | 1/2019 | Pritzkau et al. |
| 2019/0007435 A1 | 1/2019 | Pritzkau et al. |

OTHER PUBLICATIONS

Office Action in related U.S. Appl. No. 15/274,569 dated Apr. 16, 2018; 11 pages.

Office Action in related U.S. Appl. No. 15/246,053 dated May 21, 2018; 14 pages.

Non-Final Office Action issued in U.S. Appl. No. 15/274,569 dated Mar. 22, 2019, 11 pages.

US Office Action in related U.S. Appl. No. 15/274,569 dated Nov. 14, 2018, 11 pages.

US Office Action in related U.S. Appl. No. 15/274,693 dated Feb. 11, 2019, 13 pages.

US Office Action in related U.S. Appl. No. 15/274,693 dated Jul. 26, 2018, 14 pages.

US Office Action in related U.S. Appl. No. 15/216201 dated Jul. 20, 2018, 15 pages.

US Office Action in related U.S. Appl. No. 15/253,438 dated Sep. 19, 2018, 17 pages.

US Office Action in related U.S. Appl. No. 15/246,053 dated Sep. 24, 2018, 14 pages.

US Office Action in related U.S. Appl. No. 15/370,084 dated Aug. 27, 2018, 14 pages.

US Office Action in related U.S. Appl. No. 15/370,084 dated Feb. 4, 2019, 9 pages.

US Office Action in related U.S. Appl. No. 15/380,450 dated Aug. 27, 2018, 19 pages.

US Office Action in related U.S. Appl. No. 15/380,450 dated Jan. 23, 2019, 21 pages.

US Office Action in related U.S. Appl. No. 15/380,450 dated Nov. 2, 2018, 19 pages.

US Office Action in related U.S. Appl. No. 15/381,567 dated Nov. 2, 2018, 17 pages.

US Office Action in related U.S. Appl. No. 15/383,771 dated Aug. 3, 2018, 12 pages.

US Office Action in related U.S. Appl. No. 15/383,771 dated Jan. 23, 2019, 14 pages.

Schumacher, "An effective way to bring SAP Security Notes under control," Virtual Forge GmbH, Feb. 2017, https://blog.virtualforge.com/en/an-effective-way-to-bring-sap-security-notes-under-control, 4 pages.

Office Action issued in U.S. Appl. No. 15/847,478, dated Aug. 6, 2019, 36 pages.

Office Action issued in U.S. Appl. No. 15/216,046 dated Aug. 21, 2019, 23 pages.

Final Office Action issued in U.S. Appl. No. 15/381,567 dated May 22, 2019, 28 pages.

Non-Final Office Action issued in U.S. Appl. No. 15/216,046 dated Apr. 29, 2019, 23 pages.

Non-Final Office Action issued in U.S. Appl. No. 151246,053 dated May 17, 2019, 28 pages.

Non-Final Office Action issued in U.S. Appl. No. 151639,863 dated Jun. 24, 2019, 37 pages.

US Office Action in related U.S. Appl. No. 15/383,771 dated Jul. 5, 2019, 16 pages.

\* cited by examiner

PROVIDING SEMANTIC CONNECTIVITY BETWEEN A JAVA APPLICATION SERVER AND ENTERPRISE THREAT DETECTION SYSTEM USING A J2EE DATA

BACKGROUND

Enterprise threat detection (ETD) typically collects and stores a large amount/large sets of log data associated with various heterogeneous systems (often referred to as "big data") The collected log data is usually analyzed using forensic-type data analysis tools to identify suspicious behavior and to allow an appropriate response. While some implementations of ETD use a semantic layer for interpretation and attaching importance to particular log data, log-producing computing systems typically prepare log data generically and without any semantic context. As a result, data comparison can be complicated and require a large amount of computational resources.

SUMMARY

The present disclosure describes methods and systems, including computer-implemented methods, computer program products, and computer systems for providing semantic connectivity between a JAVA application server (JAS) and Enterprise Threat Detection (ETD) system using a JAVA 2 Platform, Enterprise Edition (J2EE) Data Provider.

In an implementation, a log processing job executing on a log producing computing system is initiated for processing log data associated with the log producing computing system. Log entries are determined to be available for processing. At least one instance of a Log Extractor Factory, Reader, and Transformation component are instantiated for reading and transforming the log data. Read log data is transformed into a common semantic format as transformed log data and transmitted in real-time to a Streaming Component for storage in an Enterprise Threat Detection (ETD) System. A recovery point is stored with a recovery timestamp indicating a next log entry in the log data to process.

The above-described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations so as to realize one or more of the following advantages. To provide ETD functionality, a large amount/large sets of log data associated with various heterogeneous systems (often referred to as "big data") are collected and analyzed using forensic-type data analysis tools to identify suspicious behavior and to allow an appropriate response. While implementations of ETD use a semantic layer for interpretation and attaching importance to particular log data, log-producing systems (for example, a JAS typically prepares log data generically and without any semantic context. As a result, data comparisons are complicated and require a large amount of computational resources. First, described is a J2EE Data Provider providing semantic connectivity between JAS and it's logs and an ETD system. Second, the J2EE Data Provider is part of the log extraction system and includes a semantic component to ensure that every log element will match to a part of an ETD semantic layer. This ensures the working of the respective applications in SAP ETD which require parts of log entries, even when different log-producing systems provide similar log entries in different formats, languages, etc. Third, the J2EE Data Provider allows semantic connectivity between a JAS and ETD system with performance increases in ETD data processing/comparisons. Fourth, a log extractor uses log data timestamps to extract and send data only once to the ETD system to avoid duplication of data. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
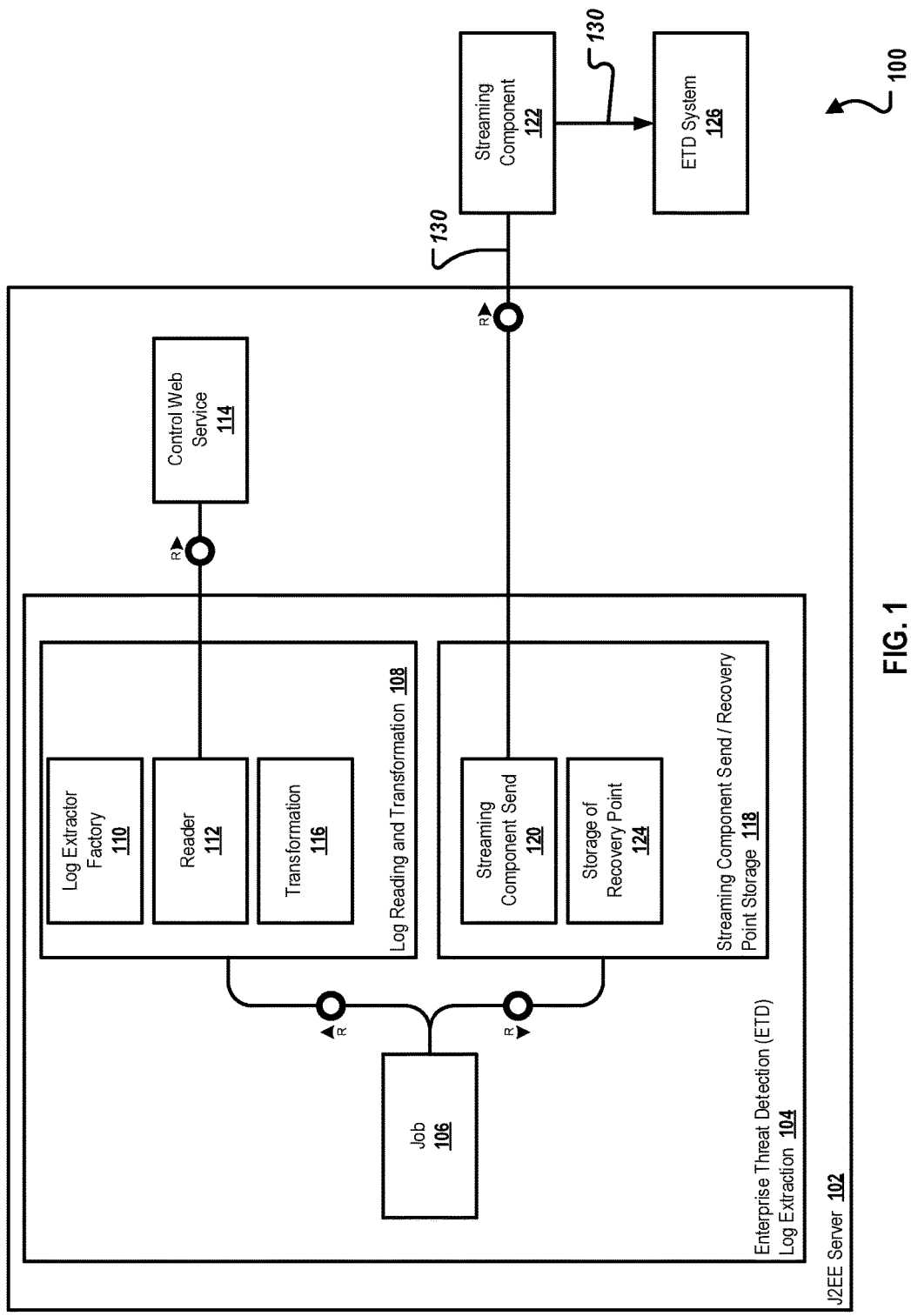
FIG. 1 is a block diagram illustrating an architectural overview of an example distributed computing system for providing semantic connectivity between a JAS and ETD system, according to an implementation.

The following detailed description describes providing semantic connectivity between a JAVA application server (JAS) and Enterprise Threat Detection (ETD) system using a JAVA 2 Platform, Enterprise Edition (J2EE) Data Provider and is presented to enable any person skilled in the art to make and use the disclosed subject matter in the context of one or more particular implementations. Various modifications to the disclosed implementations will be readily apparent to those of ordinary skill in the art, and described principles may be applied to other implementations and applications without departing from scope of the disclosure. Thus, the present disclosure is not intended to be limited to the described or illustrated implementations, but is to be accorded the widest scope consistent with the principles and features disclosed herein. For example, while the disclosure is focused on semantic connectivity between a JAS and ETD system using a J2EE data provider, those of ordinary skill in the art will understand that the described concepts can be translated to providing semantic connectivity between an ETD system and other types of log producing computing components or application servers (for example, those not based specifically on J2EE). That the description is based on semantic connectivity between an ETD system and a JAS is not meant to be limiting in any way. Semantic connectivity between an ETD system and other log-producing computing components, in as much as it is consistent with this disclosure, is considered to be within the scope of this disclosure.

ETD typically collects and stores a large amount/large sets of log data associated with various heterogeneous systems (often referred to as "big data") The collected log data is usually analyzed using forensic-type data analysis tools to identify suspicious behavior and to allow an appropriate response. While implementations of ETD use a semantic layer for interpretation and attaching importance to particular log data, log-producing computing systems (for example, a JAS typically prepares log data generically and without any semantic context. As a result, data comparisons are complicated and require a large amount of computational resources.

Log data generated by log-producing computing systems based on different technologies can look very different for similar operations. For example, a logon event in a JAVA-based computing system can have a very different format with compared to a logon event log entry generated by an ABAP-based computing system. When wishing to connect the JAVA-based and ABAP-based computing systems to an ETD system, one option is to configure the ETD system to understand the different log data formats to permit processing of the disparate log data. In another option (as described by this disclosure), each log-producing computing system can be configured to translate its logs into a common semantic format understandable to the ETD system, therefore providing semantic connectivity between the log-producing computing systems and the ETD system.

Described is a J2EE Data Provider providing semantic connectivity between JAS and it's logs and an ETD system. The J2EE Data Provider is part of the log extraction system and includes a semantic component. The J2EE Data Provider ensures that every log element will match to a part of an ETD semantic layer. In other words, similar log events from different log types and log-producing computing systems based on different technologies can be given the same semantic meaning. This ensures the working of the respective applications in SAP ETD which require parts of log entries, even when different log-producing computing systems provide similar log entries in different formats, languages, etc.

The J2EE Data Provider allows semantic connectivity between a JAS and ETD system with performance increases in ETD data processing/comparisons. Additionally, configuring log data into a common format enables development/ maintenance efficiency for software developed to process the log data. Log data can also be efficiently transferred across network connections without computationally-expensive pre- or post-processing activities based on various log formats; reducing network transfer time and bandwidth requirements. The consistent log data format increases overall processing efficiency, permits faster database operation due, at least in part, to consistent query structures (for example, entire landscape queries can be performed), consistent data storage formats and recovery methods, and accelerates overall ETD computations for faster analysis and response to possible malicious activities. Configuring "client" log-producing computing systems to transfer consistently formatted/enriched log data offloads computational operations (for example, determine semantic format/relationships, etc.) from the ETD system and also permits more robust ETD functionality with respect to available enriched data, analysis and processing of the data, and ETD responses to the data. Moreover, the transformed logs sent to the ETD can be pseudonymized to increase overall log-producing computing system security.

FIG. 1 is a block diagram illustrating an architectural overview of an example distributed computing system (EDCS) 100 for providing semantic connectivity between a JAS and ETD System 126, according to an implementation. At a high-level, EDCS 100 includes a J2EE Server 102, control Web Service 114, and Streaming Component 122 (used as a middleware connection between the J2EE Server 102 and the ETD System 126). In some implementations, all components in EDCS 100 can be connected with network 130 (even if not labeled as such). In other implementations, network 130 can include two or more networks acting to connect the components of the EDCS 100. The illustrated connections between components in the EDCS 100 can also include computing system buses or other data connections, as appropriate.

The J2EE Server 102 includes interfaces, libraries, and services components that provide various runtime functions and programming application programming interfaces (APIs), as well as applications that are deployed and execute on the J2EE Server 102. The J2EE Server can be considered in general to be a JAS or other JAVA-based server (a J2EE Data Provider) executing remotely from the ETD System 126 that generates various logs to be analyzed by the ETD System 126 for possibly malicious activities occurring with respect to the J2EE Server 102.

As illustrated, the J2EE Server 102 is configured to contain and execute the ETD Log Extraction 104 (providing semantic connectivity between a JAS and ETD System 126) and Control Web Service 114 used to retrieve particular information about the J2EE Server 102 (for example, log file paths to access log data, various metadata values, etc.). The ETD Log Extraction 104 can be considered a log data pre-processor that includes a Job 106, Log Reading and Transformation 108, and Streaming Component Send/Recovery Point Storage 118.

In some implementations, the various metadata values retrieved by the Control Web Service 114 can include information about the J2EE Server 102 configuration, user, user authorizations, usage data, systems connected to the J2EE Server 102, and other data. This data can be provided to the ETD as contextual data to permit enrichment of transformed log data, more robust ETD functionality, and the like. For example, the contextual data can include low-level operating system data provided by a software hook into a JAVA or other operating system kernel. This low-level data can help provide reference data in ETD analysis to compare against high-level log data to protect against manipulation of the high-level log data in an attempt to obfuscate malicious activities.

At a high-level, the Job 116 is triggered periodically (for example, based on a J2EE Server 102 based task scheduler or other triggering process) to obtain log data (for example, log entries) from a J2EE Server 102 and transform the log data into a common semantic format. For example a task scheduler executing on the J2EE Server 102 can trigger the Job 106 every 1 minute if the Job 106 is not already executing). In some implementations, the period value can be configured as a static value or by a dynamic process (for example, based on network load, data storage conditions, microprocessor utilization, and the like).

In typical implementations, the Job 106 can be configured to read a configuration file. The configuration file can specify, for example: which log types should be processed, the log formats (new log types can be added by updating the configuration), credentials (needed when adding system data), connection details for the Streaming Component 122, and the like. For example, the Job 106 can read the configuration file and when instructing the Log Reading and Transformation 108 component, pass which log types should be processed, particular log formats for the specified logs, and credentials to permit access by the Control Web Service 114 to system data. The Job 106 can also pass connection details to the Streaming Component Send/Recovery Point Storage 118 to permit transfer of transformed data to the Streaming Component 122.

The triggered Job 106 initiates a request to Log Reading and Transformation 108 and to Streaming Component/Recovery Point Storage 118. Log Reading and Transformation 108 retrieves, analyzes, and transforms log data into a common semantic format. The Job 106 is notified by the Log Reading and Transformation 108 of completion of the log data transformation task. The Job 106 then requests that the Streaming Component/Recovery Point Storage 118 transfer the transformed log data to the Streaming Component 122 to permit storage and use of the transformed log data by the ETD System 126. The Streaming Component Send/Recovery Point Storage 118 is also used to store a recovery point for use by the Reader 112 to properly locate and read additional log data generated by the J2EE Server 102 for additional transformation and transfer to the Streaming Component 122. Note that if a failure occurs in the transformation/transfer processes, the timestamp associated with the last stored recovery point with respect to successfully processed log data can be used to determine what log data to re-process.

Typically, the Log Reading and Transformation 104 includes a Log Extractor Factory 110, Reader 112, and Transformation 116 component. The Log Extractor Factory 110 is configured to extract data from different log types (for example, logon, security, application input/output, HTTP access, etc.). The Log Extractor Factory 110 can instantiate different instances of log extractors (not illustrated) necessary to extract data from the different log types and how to extract data associated with each log type. In some implementations, which types of logs to process (that is, extract data from) can be determined by one or more descriptor/configuration files (for example, process HTTP access logs only and ignore other log types) read by the Job 106 and data passed to the Log Reading and Transformation 108. Log files typically include lines (or entries) of a short protocol describing a particular action (for example, a logon action). Each line typically includes, for example and not limited to, timestamp, action, involved actors, involved systems, involved networks, and the like. The protocol format for each log type can also vary (for example, based on one or more of standardization bodies, customization, proprietary formats, and the like) to require interpretation of log entries (for example, even though the log format might be formally identical for NETWEAVER ABAP and NETWEAVER JAVA implementations, a log entry for each application must be interpreted to ensure proper data recovery/analysis for the log entry). For this reason, log extractors are configured (for example, by human users or possibly machine learning/artificial intelligence algorithms) to properly interpret varying log entries for data extraction.

The Reader 112 sends a request to the Control Web Service 114 to obtain the above-mentioned particular information about the J2EE Server 102 (for example, log file paths to access log data, metadata about server configuration, etc.). The server-specific data is used by instantiated log extractor instances to obtain and extract log data and to provide data for the Transformation 116 to transform (for example, normalize, pseudonymize, enrich with additional data (for example, the server-specific data), etc.) the extracted log data into a common semantic format for use by the ETD System 126. The Reader 112 is configured to access stored recovery points in order to determine "fresh" log data by comparing read log entries against the latest recovery timestamp (typically the timestamp of the last processed log entry pertaining to a particular log). Note that there can be multiple recovery timestamps within a recovery point or multiple recovery points (each associated with a particular log). Log entries with a timestamp newer than the last recovery point timestamp are processed. Accessing logs based on timestamp ensures that log data is not processed twice and that no duplicate data is sent to the ETD System 126. The Reader 112 can also leverage one or more particular log extractors instantiated by the Log Extractor Factory 110 to extract log data from log files for processing by the Reader 112.

Following transformation of the log data, the Job 106 can be notified by the Log Reading and Transformation 108 that the transformation task is complete and can transmit a request to the Streaming Component Send/Recovery Point Storage 118 to send the transformed log data to the Streaming Component 122. In typical implementations, the transformed data is not stored on the J2EE Server 102. The Streaming Component 122 is typically configured with a "guaranteed delivery" feature and will handle storage of the transformed data until it can be sent to the ETD System 126 (for example, due to a network outage/error, etc.). Transformation 116 is typically configured to access/use one or more descriptor/configuration files, semantic models, or other mapping type data (not illustrated) to transform log data in to a common semantic format.

Typically, the Streaming Component Send/Recovery Point Storage 118 includes a Streaming Component Send 120 and Storage of Recovery Point 124 component. The Streaming Component Send 120 is used to transmit transformed log data and contextual data (for example, metadata about the J2EE Server 102, users, and other data) to the Streaming Component 122. The Streaming Component Send 120 receives data packages which it is configured to typically send in real-time (or in substantially real-time). In some implementations, the Streaming Component Send 120 can be configured to send data periodically (for example, every 10, 30, or 60 seconds, etc.). The transmission periods can be configured as a static value or by a dynamic process (for example, based on network load, data storage conditions, microprocessor utilization, and the like).

The Streaming Component 122 can be considered to serve as a middleware component (typically partially or wholly remote from the ETD System 126) used to process and transmit data to the ETD System 126. In some implementations, the Streaming Component 122 can be configured as an event stream processor (ESP), a smart data streaming (SDS) service (for example, SAP HANA SDS), an ESP representational state transfer (REST) Point, etc. In some implementations, the Streaming Component 122 receives data from the Streaming Component Sent 120 and can further process the received data (for example, validating the received data, extracting elements of the received data, mapping the extracted elements into an ETD System 126 internal-type data structure, further enriching the mapped data (for example, by incorporating the received contextual information), and writing the enriched log entry to a database (for example, a SAP HANA in-memory database) associated with the ETD System 126.

Storage of Recovery Point 124 provides functionality to store a recovery point associated with functionality performed by the ETD Log Extraction 104. The Job 106 is configured to retrieve a certain amount of log data to process. In some implementations, the amount of log data to retrieve can be configured as a static value or by a dynamic process (for example, based on network load, data storage conditions, microprocessor utilization, and the like). When the Job 106 completes processing and transmission of transformed log data to the Streaming Component 122, the Storage of Recovery Point 124 persists the latest date/time associated with the processed log data in a recovery point (not illustrated) so that the next log data retrieval can retrieve from the proper point forward in the log data. In some implementations, in the case of a failure in the log data transformation process, prior stored recovery points can be retrieved to determine the proper log data to retrieve if the log data transformation process is re-executed.

Note that in case of a failure of one or more of the above-described functionalities, the Streaming Component Send/Recovery Point Storage 118 can send the raw log data to the Streaming Component 122 for storage in the ETD in a particular storage location. This raw log data can be used for some ETD functionality regardless of a lack of transformation and also ensures that log data is not processed twice.

Figure 2:
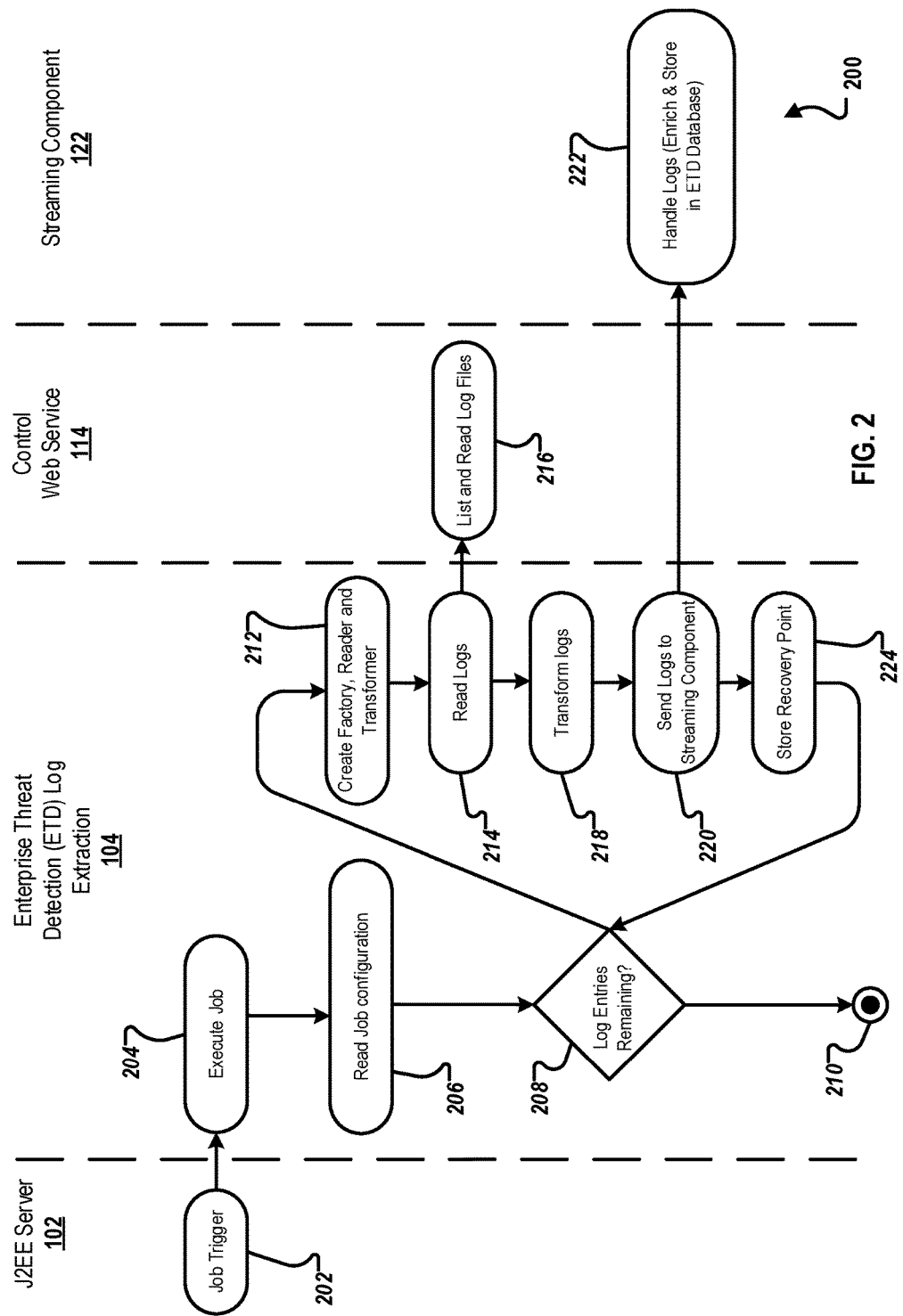
FIG. 2 is a swim diagram illustrating a method for providing semantic connectivity between a JAS and ETD system, according to an implementation.

FIG. 2 is a swim diagram illustrating a method 200 for providing semantic connectivity between a JAS and ETD System, according to an implementation. For clarity of presentation, the description that follows generally describes method 200 in the context of the other figures in this description. However, it will be understood that method 200 may be performed, for example, by any suitable system, environment, software, and hardware, or a combination of systems, environments, software, and hardware as appropriate. In some implementations, various steps of method 200 can be run in parallel, in combination, in loops, or in any order.

At 202, a task scheduler executing on the J2EE Server initiates periodic execution of a Job to manage transformation of J2EE Server log data into a common semantic format and for transfer to an ETD System. From 202, method 200 proceeds to 204.

At 204, the Job as part of the ETD Log Extraction begins execution. From 204, method 200 proceeds to 206.

At 206, the Job reads a configuration detailing, for example, log types to process, associated log formats, credentials to access log producing computer system data, connection details to the Streaming Component, etc. From 206, method 200 proceeds to 208.

At 208, a determination is made as to whether log entries remain to be processed (for example, have new log entries been generated within the last 1 minute?). For example, the job can initiate a query to the J2EE Server 102 requesting whether log data exists in one or more log files. In some instances, the Job 106 can access a stored recovery point to determine the latest recovery timestamp for use with the query. If it is determined at 208 that there are no further log entries to process, method 200 proceeds to 210 where method 200 stops. However, if it is determined at 208 that there are log entries to process, method 200 proceeds to 212.

At 212, the Job requests transformation of specified J2EE Server log entries by the Log Reading and Transformation component. An appropriate log extractor to extract log data, a Reader to read log data and to obtain J2EE Server contextual data, and a Transformer to transform log data into a common semantic format is instantiated. From 212, method 200 proceeds to 214.

At 214, the log data is read by the Reader and data extracted from the read logs by the instantiated log extractor. From 214, method 200 proceeds to both 216 and 218.

At 216, the Reader also requests J2EE Server contextual data from a J2EE Server Control Web Service. From 216, method 200 proceeds to 218.

At 218, the extracted log data is transformed by the Transformation into a common semantic format. From 218, method 200 proceeds to 220.

At 220, the Job requests that the transformed log data and J2EE Server Contextual data is sent in real-time to a Streaming Component (for subsequent transfer to an ETD System). From 218, method 200 proceeds to both 222 and 224.

At 222, the Streaming Component receives the transformed log data and the J2EE Contextual data for additional processing (as described above) and for transfer to the ETD System.

At 224, a recovery point is stored identifying the subset of the processed log data. The Job can use this data to pick up with a subsequent subset of log data when configured (based on the configuration read in 206) to again request transformation of log data and to send the transformed log data to the Streaming Component. From 224, method 200 proceeds back to 208.

Figure 3:
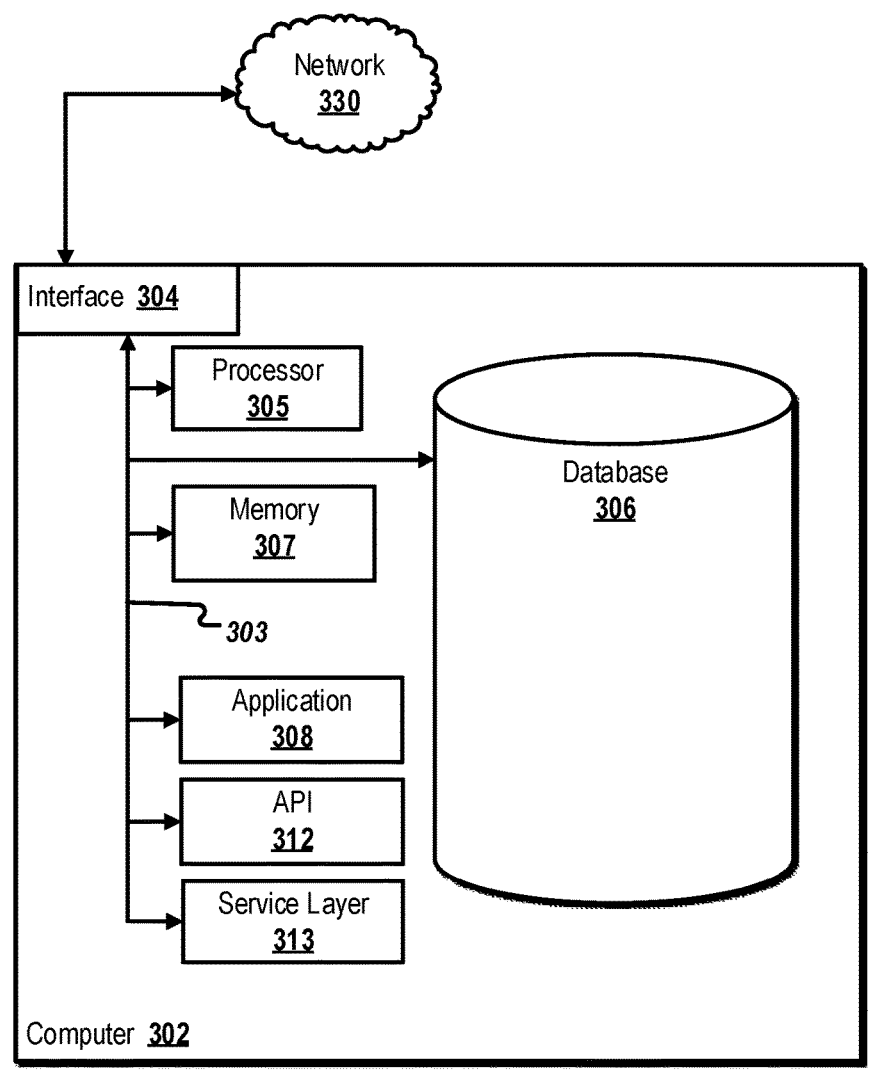
FIG. 3 is a block diagram illustrating an exemplary computer system used to provide computational functionalities associated with described algorithms, methods, functions, processes, flows, and procedures as described in the instant disclosure, according to an implementation.

FIG. 3 is a block diagram of an exemplary computer system 300 used to provide computational functionalities associated with described algorithms, methods, functions, processes, flows, and procedures as described in the instant disclosure, according to an implementation. The illustrated computer 302 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 302 may comprise a computer that includes an input device, such as a keypad, keyboard, touch screen, or other device that can accept user information, and an output device that conveys information associated with the operation of the computer 302, including digital data, visual, or audio information (or a combination of information), or a graphical user interface (GUI).

The computer 302 can serve in a role as a client, network component, a server, a database or other persistency, or any other component (or a combination of roles) of a computer system for performing the subject matter described in the instant disclosure. The illustrated computer 302 is communicably coupled with a network 330 (for example, network 130). In some implementations, one or more components of the computer 302 may be configured to operate within environments, including cloud-computing-based, local, global, or other environment (or a combination of environments).

At a high level, the computer 302 is an electronic computing device operable to receive, transmit, process, store, or manage data and information associated with the described subject matter. According to some implementations, the computer 302 may also include or be communicably coupled with an application server, e-mail server, web server, caching server, streaming data server, or other server (or a combination of servers).

The computer 302 can receive requests over network 330 from a client application (for example, executing on another computer 302) and responding to the received requests by processing the said requests in an appropriate software application. In addition, requests may also be sent to the computer 302 from internal users (for example, from a command console or by other appropriate access method), external or third-parties, other automated applications, as well as any other appropriate entities, individuals, systems, or computers.

Each of the components of the computer 302 can communicate using a system bus 303. In some implementations, any or all of the components of the computer 302, both hardware or software (or a combination of hardware and software), may interface with each other or the interface 304 (or a combination of both) over the system bus 303 using an application programming interface (API) 312 or a service layer 313 (or a combination of the API 312 and service layer 313). The API 312 may include specifications for routines, data structures, and object classes. The API 312 may be either computer-language independent or dependent and refer to a complete interface, a single function, or even a set of APIs. The service layer 313 provides software services to the computer 302 or other components (whether or not illustrated) that are communicably coupled to the computer 302. The functionality of the computer 302 may be accessible for all service consumers using this service layer. Software services, such as those provided by the service layer 313, provide reusable, defined functionalities through a defined interface. For example, the interface may be software written in JAVA, C++, or other suitable language providing data in extensible markup language (XML) format or other suitable format. While illustrated as an integrated component of the computer 302, alternative implementations may illustrate the API 312 or the service layer 313 as stand-alone components in relation to other components of the computer 302 or other components (whether or not illustrated) that are communicably coupled to the computer 302. Moreover, any or all parts of the API 312 or the service layer 313 may be implemented as child or sub-modules of another software module, enterprise application, or hardware module without departing from the scope of this disclosure.

The computer 302 includes an interface 304. Although illustrated as a single interface 304 in FIG. 3, two or more interfaces 304 may be used according to particular needs, desires, or particular implementations of the computer 302. The interface 304 is used by the computer 302 for communicating with other systems in a distributed environment that are connected to the network 330 (whether illustrated or not). Generally, the interface 304 comprises logic encoded in software or hardware (or a combination of software and hardware) and operable to communicate with the network 330. More specifically, the interface 304 may comprise software supporting one or more communication protocols associated with communications such that the network 330 or interface's hardware is operable to communicate physical signals within and outside of the illustrated computer 302.

The computer 302 includes a processor 305. Although illustrated as a single processor 305 in FIG. 3, two or more processors may be used according to particular needs, desires, or particular implementations of the computer 302. Generally, the processor 305 executes instructions and manipulates data to perform the operations of the computer 302 and any algorithms, methods, functions, processes, flows, and procedures as described in the instant disclosure.

The computer 302 also includes a database 306 that can hold data for the computer 302 or other components (or a combination of both) that can be connected to the network 330 (whether illustrated or not). For example, database 306 can be an in-memory, conventional, or other type of database storing data consistent with this disclosure. In some implementations, database 306 can be a combination of two or more different database types (for example, a hybrid in-memory and conventional database) according to particular needs, desires, or particular implementations of the computer 302 and the described functionality. Although illustrated as a single database 306 in FIG. 3, two or more databases (of the same or combination of types) can be used according to particular needs, desires, or particular implementations of the computer 302 and the described functionality. While database 306 is illustrated as an integral component of the computer 302, in alternative implementations, database 306 can be external to the computer 302. The database 306 can be configured to store, process, manage, or perform any applicable function consistent with this disclosure for any data type described in this disclosure.

The computer 302 also includes a memory 307 that can hold data for the computer 302 or other components (or a combination of both) that can be connected to the network 330 (whether illustrated or not). For example, memory 307 can be random access memory (RAM), read-only memory (ROM), optical, magnetic, and the like storing data consistent with this disclosure. In some implementations, memory 307 can be a combination of two or more different types of memory (for example, a combination of RAM and magnetic storage) according to particular needs, desires, or particular implementations of the computer 302 and the described functionality. Although illustrated as a single memory 307 in FIG. 3, two or more memories 307 (of the same or combination of types) can be used according to particular needs, desires, or particular implementations of the computer 302 and the described functionality. While memory 307 is illustrated as an integral component of the computer 302, in alternative implementations, memory 307 can be external to the computer 302.

The application 308 is an algorithmic software engine providing functionality according to particular needs, desires, or particular implementations of the computer 302, particularly with respect to functionality described in this disclosure. For example, application 308 can serve as one or more components, modules, applications, etc. Further, although illustrated as a single application 308, the application 308 may be implemented as multiple applications 308 on the computer 302. In addition, although illustrated as integral to the computer 302, in alternative implementations, the application 308 can be external to the computer 302.

There may be any number of computers 302 associated with, or external to, a computer system containing computer 302, each computer 302 communicating over network 330. Further, the term "client," "user," and other appropriate terminology may be used interchangeably as appropriate without departing from the scope of this disclosure. Moreover, this disclosure contemplates that many users may use one computer 302, or that one user may use multiple computers 302.

Described implementations of the subject matter can include one or more features, alone or in combination.

For example, in a first implementation, a computer-implemented method, comprising: initiating execution of a log processing job executing on a log producing computing system for processing log data associated with the log producing computing system; determining that log entries are available for processing; instantiating at least one instance of a Log Extractor Factory, Reader, and Transformation component for reading and transforming the log data; transforming read log data into a common semantic format as transformed log data; transmitting the transformed log data in real-time to a Streaming Component for storage in an Enterprise Threat Detection (ETD) System; and storing a recovery point with a recovery timestamp indicating a next log entry in the log data to process.

The foregoing and other described implementations can each optionally include one or more of the following features:

A first feature, combinable with any of the following features, further comprising receiving a trigger from a task scheduler to initiate execution of a log processing job.

A second feature, combinable with any of the previous or following features, further comprising accessing a log processing job configuration containing at least one of log types to process, associated log formats, credentials to access log producing computer system data, or connection details to the Streaming Component.

A third feature, combinable with any of the previous or following features, further comprising, using the instantiated Log Extractor Factory, instantiating an instance of a Log Extractor to extract data from a particular log file type.

A fourth feature, combinable with any of the previous or following features, further comprising requesting log producing computing system data from a Control Web Service executing on the log producing computing system, wherein the log producing computing system data includes at least one of log file paths to access log data, metadata about the log producing computing system configuration, or user data, authentication data.

A fifth feature, combinable with any of the previous or following features, wherein the transformed log data is enriched with the log producing computing system data.

A sixth feature, combinable with any of the previous or following features, further comprising, on a processing failure with reading and transforming the log data or transmitting the transformed log data to the Streaming Component, leveraging the stored recovery point to initiate reprocessing of the log data.

In a second implementation, a non-transitory, computer-readable medium storing one or more instructions executable by a computer system to perform operations comprising: initiating execution of a log processing job executing on a log producing computing system for processing log data associated with the log producing computing system; determining that log entries are available for processing; instantiating at least one instance of a Log Extractor Factory, Reader, and Transformation component for reading and transforming the log data; transforming read log data into a common semantic format as transformed log data; transmitting the transformed log data in real-time to a Streaming Component for storage in an Enterprise Threat Detection (ETD) System; and storing a recovery point with a recovery timestamp indicating a next log entry in the log data to process.

The foregoing and other described implementations can each optionally include one or more of the following features:

A first feature, combinable with any of the following features, further comprising one or more instructions to receive a trigger from a task scheduler to initiate execution of a log processing job.

A second feature, combinable with any of the previous or following features, further comprising one or more instructions to access a log processing job configuration containing at least one of log types to process, associated log formats, credentials to access log producing computer system data, or connection details to the Streaming Component.

A third feature, combinable with any of the previous or following features, further comprising one or more instructions to instantiate, using the instantiated Log Extractor Factory, an instance of a Log Extractor to extract data from a particular log file type.

A fourth feature, combinable with any of the previous or following features, further comprising one or more instructions to request log producing computing system data from a Control Web Service executing on the log producing computing system, wherein the log producing computing system data includes at least one of log file paths to access log data, metadata about the log producing computing system configuration, or user data, authentication data.

A fifth feature, combinable with any of the previous or following features, wherein the transformed log data is enriched with the log producing computing system data.

A sixth feature, combinable with any of the previous or following features, further comprising one or more instructions to leverage, on a processing failure with reading and transforming the log data or transmitting the transformed log data to the Streaming Component, the stored recovery point to initiate reprocessing of the log data.

In a third implementation, a computer-implemented system, comprising: a computer memory; and a hardware processor interoperably coupled with the computer memory and configured to perform operations comprising: initiating execution of a log processing job executing on a log producing computing system for processing log data associated with the log producing computing system; determining that log entries are available for processing; instantiating at least one instance of a Log Extractor Factory, Reader, and Transformation component for reading and transforming the log data; transforming read log data into a common semantic format as transformed log data; transmitting the transformed log data in real-time to a Streaming Component for storage in an Enterprise Threat Detection (ETD) System; and storing a recovery point with a recovery timestamp indicating a next log entry in the log data to process.

The foregoing and other described implementations can each optionally include one or more of the following features:

A first feature, combinable with any of the following features, further configured to receive a trigger from a task scheduler to initiate execution of a log processing job.

A second feature, combinable with any of the previous or following features, further configured to access a log processing job configuration containing at least one of log types to process, associated log formats, credentials to access log producing computer system data, or connection details to the Streaming Component.

A third feature, combinable with any of the previous or following features, further configured to instantiate, using the instantiated Log Extractor Factory, an instance of a Log Extractor to extract data from a particular log file type.

A fourth feature, combinable with any of the previous or following features, further configured to request log producing computing system data from a Control Web Service executing on the log producing computing system, wherein the log producing computing system data includes at least one of log file paths to access log data, metadata about the log producing computing system configuration, or user data, authentication data.

A fifth feature, combinable with any of the previous or following features, wherein the transformed log data is enriched with the log producing computing system data.

A sixth feature, combinable with any of the previous or following features, further configured to leverage, on a processing failure with reading and transforming the log data or transmitting the transformed log data to the Streaming Component, the stored recovery point to initiate reprocessing of the log data.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate. Thresholds used to make computational determinations can be statically, dynamically, or both statically and dynamically determined.

The methods, processes, logic flows, etc. described in this specification can be performed by one or more programmable computers executing one or more computer programs to perform functions by operating on input data and generating output. The methods, processes, logic flows, etc. can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:
1. A computer-implemented method, comprising:
  initiating execution of a log processing job executing on a log producing computing system for processing log data associated with the log producing computing system;
  determining that log entries are available for processing;

instantiating at least one instance of a Log Extractor Factory, Reader, and Transformation component for reading and transforming the log data;
transforming read log data into a common semantic format as transformed log data;
receiving log producing computing system data from a Control Web Service executing on the log producing computing system, the log producing computing system data including operating-system kernel data of the log producing computing system that provides reference data for Enterprise Threat Detection (ETD) analysis in an ETD system for detecting manipulation of the transformed log data;
enriching the transformed log data with the log producing computing system data to generate enriched log data;
transmitting the enriched log data in real-time to a Streaming Component for storage in the ETD System; and
storing a recovery point with a recovery timestamp indicating a next log entry in the log data to process.

2. The computer-implemented method of claim 1, further comprising receiving a trigger from a task scheduler to initiate execution of a log processing job.

3. The computer-implemented method of claim 1, further comprising accessing a log processing job configuration containing at least one of log types to process, associated log formats, credentials to access log producing computer system data, or connection details to the Streaming Component.

4. The computer-implemented method of claim 1, further comprising, using the instantiated Log Extractor Factory, instantiating an instance of a Log Extractor to extract data from a particular log file type.

5. The computer-implemented method of claim 1, further comprising, on a processing failure with reading and transforming the log data or transmitting the transformed log data to the Streaming Component, leveraging the stored recovery point to initiate reprocessing of the log data.

6. A non-transitory, computer-readable medium storing one or more instructions executable by a computer system to perform operations comprising:
initiating execution of a log processing job executing on a log producing computing system for processing log data associated with the log producing computing system;
determining that log entries are available for processing;
instantiating at least one instance of a Log Extractor Factory, Reader, and Transformation component for reading and transforming the log data;
transforming read log data into a common semantic format as transformed log data;
receiving log producing computing system data from a Control Web Service executing on the log producing computing system, the log producing computing system data including operating-system kernel data of the log producing computing system that provides reference data for Enterprise Threat Detection (ETD) analysis in an ETD system for detecting manipulation of the transformed log data;
enriching the transformed log data with the log producing computing system data to generate enriched log data;
transmitting the enriched log data in real-time to a Streaming Component for storage in the ETD System; and
storing a recovery point with a recovery timestamp indicating a next log entry in the log data to process.

7. The non-transitory, computer-readable medium of claim 6, further comprising one or more instructions to receive a trigger from a task scheduler to initiate execution of a log processing job.

8. The non-transitory, computer-readable medium of claim 6, further comprising one or more instructions to access a log processing job configuration containing at least one of log types to process, associated log formats, credentials to access log producing computer system data, or connection details to the Streaming Component.

9. The non-transitory, computer-readable medium of claim 6, further comprising one or more instructions to instantiate, using the instantiated Log Extractor Factory, an instance of a Log Extractor to extract data from a particular log file type.

10. The non-transitory, computer-readable medium of claim 6, further comprising one or more instructions to leverage, on a processing failure with reading and transforming the log data or transmitting the transformed log data to the Streaming Component, the stored recovery point to initiate reprocessing of the log data.

11. A computer-implemented system, comprising:
a computer memory; and
a hardware processor interoperably coupled with the computer memory and configured to perform operations comprising:
initiating execution of a log processing job executing on a log producing computing system for processing log data associated with the log producing computing system;
determining that log entries are available for processing;
instantiating at least one instance of a Log Extractor Factory, Reader, and Transformation component for reading and transforming the log data;
transforming read log data into a common semantic format as transformed log data;
receiving log producing computing system data from a Control Web Service executing on the log producing computing system, the log producing computing system data including operating-system kernel data of the log producing computing system that provides reference data for Enterprise Threat Detection (ETD) analysis in an ETD system for detecting manipulation of the transformed log data;
enriching the transformed log data with the log producing computing system data to generate enriched log data;
transmitting the enriched log data in real-time to a Streaming Component for storage in the ETD System; and
storing a recovery point with a recovery timestamp indicating a next log entry in the log data to process.

12. The computer-implemented system of claim 11, further configured to receive a trigger from a task scheduler to initiate execution of a log processing job.

13. The computer-implemented system of claim 11, further configured to access a log processing job configuration containing at least one of log types to process, associated log formats, credentials to access log producing computer system data, or connection details to the Streaming Component.

14. The computer-implemented system of claim 11, further configured to instantiate, using the instantiated Log Extractor Factory, an instance of a Log Extractor to extract data from a particular log file type.

15. The computer-implemented system of claim 11, further configured to leverage, on a processing failure with reading and transforming the log data or transmitting the transformed log data to the Streaming Component, the stored recovery point to initiate reprocessing of the log data.

\* \* \* \* \*